United States Patent
Ito

(10) Patent No.: US 7,395,975 B2
(45) Date of Patent: *Jul. 8, 2008

(54) IC CARD WITH RADIO INTERFACE FUNCTION, ANTENNA MODULE AND DATA PROCESSING APPARATUS USING THE IC CARD

(75) Inventor: Takafumi Ito, Ome (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/706,994

(22) Filed: Feb. 16, 2007

(65) Prior Publication Data

US 2007/0138305 A1    Jun. 21, 2007

Related U.S. Application Data

(60) Continuation of application No. 10/911,523, filed on Aug. 5, 2004, now Pat. No. 7,290,716, which is a division of application No. 09/748,857, filed on Dec. 28, 2000, now abandoned.

(30) Foreign Application Priority Data

Jan. 5, 2000    (JP) .............................. 2000-000486

(51) Int. Cl.
*G06K 19/06* (2006.01)

(52) U.S. Cl. ...................................... 235/492; 361/737

(58) Field of Classification Search .................. 235/492; 361/737; 343/702
See application file for complete search history.

(56) References Cited

U.S. PATENT DOCUMENTS 4,105,156 A   8/1978   Dethloff
5,610,941 A   3/1997   Tanaka et al.
5,708,833 A   1/1998   Kinney et al.
5,877,488 A   3/1999   Klatt et al.
5,913,174 A   6/1999   Casarez et al.
5,914,980 A   6/1999   Yokota et al.
5,918,163 A   6/1999   Rossi
5,999,294 A   12/1999  Petsko
6,029,892 A   2/2000   Miyake (Continued)

FOREIGN PATENT DOCUMENTS

JP    4-140895    5/1992

(Continued)

OTHER PUBLICATIONS

U.S. Appl. No. 09/748,855, filed Dec. 28, 2000.

(Continued)

*Primary Examiner*—Jamara A Franklin
(74) *Attorney, Agent, or Firm*—Finnegan, Henderson, Farabow, Garrett & Dunner, L.L.P.

(57) ABSTRACT

An SD memory card contains an RF circuit, a controller LSI and a flash memory. The RF circuit is connected to an antenna module attached to the SD memory card. The controller LSI executes radio interface control and interface control for the SD memory card. By running a protocol control program and an SD memory card interface control program stored in a ROM, using an MPU, the controller LSI executes upper-protocol control and SD memory card interface control (security data access control, flash memory access control).

12 Claims, 8 Drawing Sheets

U.S. PATENT DOCUMENTS

| | | | |
|---|---|---|---|
| 6,070,804 | A | 6/2000 | Miyamoto |
| 6,073,856 | A | 6/2000 | Takahashi |
| 6,133,884 | A | 10/2000 | Talvitie et al. |
| 6,263,214 | B1 | 7/2001 | Yazaki et al. |
| 6,295,031 | B1 | 9/2001 | Wallace et al. |
| 6,336,039 | B1 | 1/2002 | Usui et al. |
| 6,427,065 | B1 | 7/2002 | Suga et al. |
| 6,463,095 | B1 | 10/2002 | Kataoka et al. |
| 6,608,550 | B2 | 8/2003 | Hayashi et al. |
| 6,618,013 | B1 | 9/2003 | Aldous |
| 6,762,725 | B2 | 7/2004 | Beard et al. |
| 7,171,503 | B2 * | 1/2007 | Lee et al. .................... 710/300 |

FOREIGN PATENT DOCUMENTS

| | | |
|---|---|---|
| JP | 6-82344 | 3/1994 |
| JP | 7-508843 | 9/1995 |
| JP | 8-16859 | 1/1996 |
| JP | 8-101751 | 4/1996 |
| JP | 8-101900 | 4/1996 |
| JP | 10-198776 | 7/1998 |
| JP | 11-272823 | 10/1999 |
| JP | 2000-514962 | 11/2000 |
| JP | 2001-144634 | 5/2001 |
| JP | 2001-506392 | 5/2001 |

OTHER PUBLICATIONS

U.S. Appl. No. 09/748,856, filed Dec. 28, 2000.

Notification of Reasons for Rejection issued by the Japanese Patent Office, mailed Nov. 28, 2006, in Japanese Application No. 2000-000486 and English translation of Notification.

Final Notice of Rejection from the Japanese Patent Office in Application No. 2000-000486, mailed Apr. 3, 2007 (5 pages).

* cited by examiner

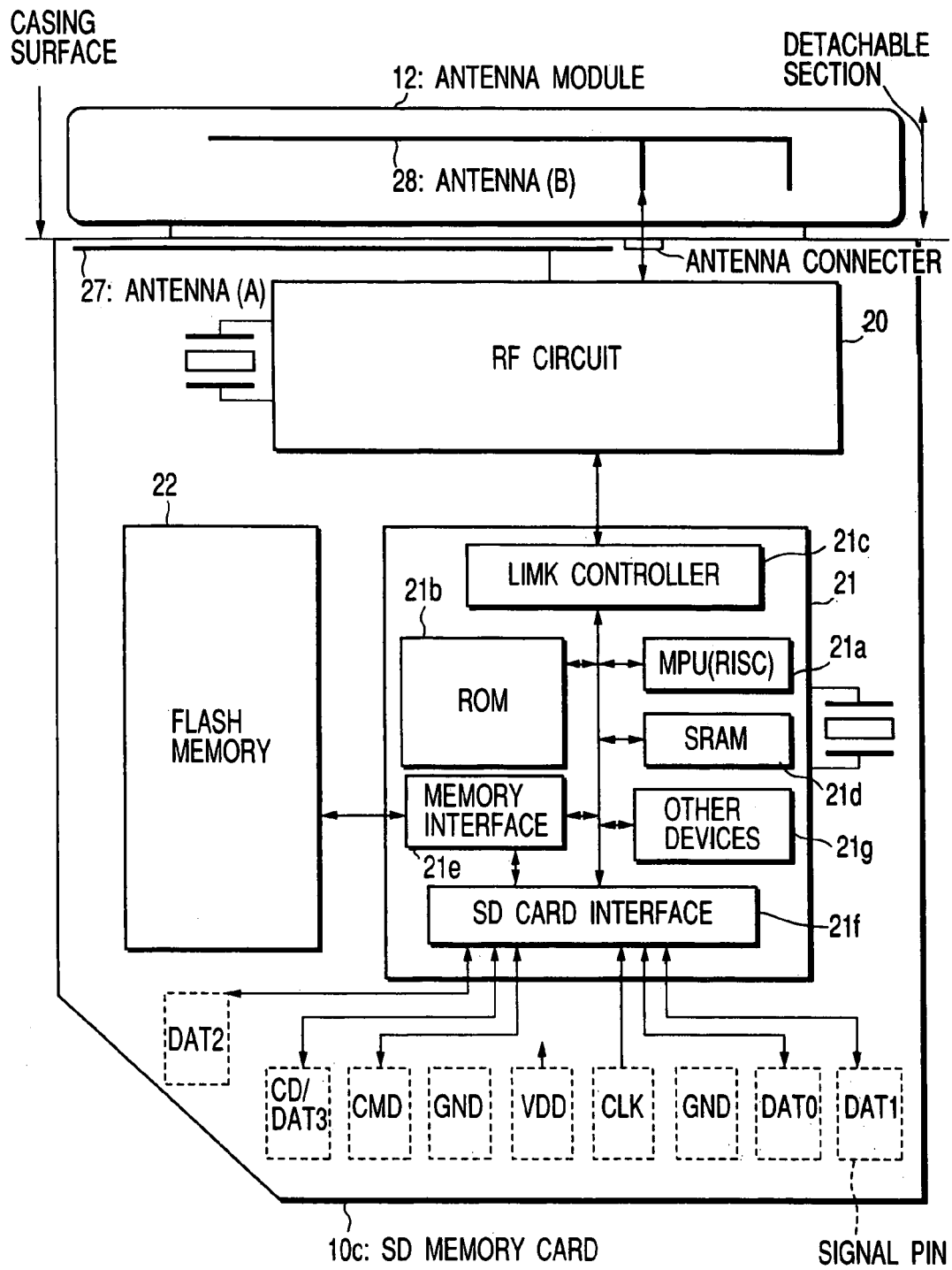
F I G. 4

IC CARD WITH RADIO INTERFACE FUNCTION, ANTENNA MODULE AND DATA PROCESSING APPARATUS USING THE IC CARD

CROSS-REFERENCE TO RELATED APPLICATIONS

This is a continuation of application Ser. No. 10/911,523, filed Aug. 5, 2004, now U.S. Pat. No. 7,290,716 which is a divisional of application Ser. No. 09/748,857, filed Dec. 28, 2000, now abandoned which is based upon and claims the benefit of priority from prior Japanese Patent Application No. 2000-000486, filed Jan. 5, 2000, each of which is incorporated herein by reference.

BACKGROUND OF THE INVENTION

This invention relates to an IC card with a radio interface function, which is formed of a small IC card such as an SD (Secure Digital) card, an antenna module used for this IC card, and a data processing apparatus using the IC card.

Recent portable personal computers or various types of data processing apparatuses have a function for using an IC card (PC card) based on the PCMCIA (Personal Computer Memory Card International Association). The PC card is used not only as a data storing medium, but also as an extension device for expanding the peripheral functions of a host apparatus. For example, the PC card is used as a modem, a network card, a hard disk, etc.

In addition to the PC card based on the PCMCIA, smaller IC cards are now being used. The IC cards of this type include, for example, an SD (Secure Digital) memory card provided with an electrically programmable flash memory, in which once stored data does not disappear even when the power is turned off.

As described above, PC cards based on the PCMCIA are being used as expansion devices for adding various peripheral functions that include a communication function. On the other hand, it is difficult to use SD memory cards, smaller than the PC cards, for adding a function, since data for realizing the function is hard to store therein. In particular, there is no conventional SD memory card of a small size that installs a radio interface function.

BRIEF SUMMARY OF THE INVENTION

It is the object of the invention to provide an IC card with a radio interface function installed therein, an antenna module used for the IC card, and a data processing apparatus using the IC card.

According to a first aspect of the invention, there is provided an IC card containing a radio interface function, comprising: a high frequency circuit to be connected to an antenna; a memory; and a controller for controlling access to the memory and executing radio interface control related to radio communication.

Preferably, the IC card further comprises antenna attachment means attachable to and detachable from an antenna module provided with an antenna.

More preferably, the IC card further comprises an antenna connected to the high frequency circuit.

Also preferably, the controller controls the memory so as to store, in a predetermined area of the memory, information specifying a destination of connection, and executes the radio interface control on the basis of the information.

According to a second aspect of the invention, there is provided an antenna module comprising: IC card attachment means to be connected to an IC card that has a radio interface function; and an antenna to be connected to means incorporated in the IC card for realizing the radio interface function.

Preferably, the antenna module further comprises a high frequency amplifier connected between the antenna and the means for realizing the radio interface function, when the antenna module is connected to the IC card by the IC card attachment means.

According to a third aspect of the invention, there is provided an IC card containing a radio interface function, comprising: an antenna; a high frequency circuit connected to the antenna; a controller for executing radio interface control related to radio communication executed using the high frequency circuit; and connection means for connecting the controller to another IC card.

According to a fourth aspect of the invention, there is provided a data processing apparatus having a slot for inserting therein an IC card, comprising: an antenna incorporated in a casing of the data processing apparatus; and connection means for connecting the antenna to an antenna terminal incorporated in the IC card when the IC card is inserted in the slot.

Preferably, the antenna is provided in an eject lever to be operated to eject the IC card from the slot.

More preferably, the antenna is provided on a surface of the casing.

Yet preferably, the IC card further comprises an antenna connecting terminal to be connected to an antenna that is provided in an eject lever incorporated in a data processing apparatus and to be operated to eject the IC card from a slot of the data processing apparatus when the IC card is inserted in the slot.

Also preferably, the IC card further comprises an antenna connecting terminal to be connected to an antenna provided on a surface of a casing of a data processing apparatus, when the IC card is inserted in a mechanism incorporated in the data processing apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a block diagram illustrating an SD memory card 10c and an antenna module 12 employed in a second embodiment of the invention;

DETAILED DESCRIPTION OF THE INVENTION

The embodiments of the invention will be described with reference to the accompanying drawings.

Figures 1A, 1B:
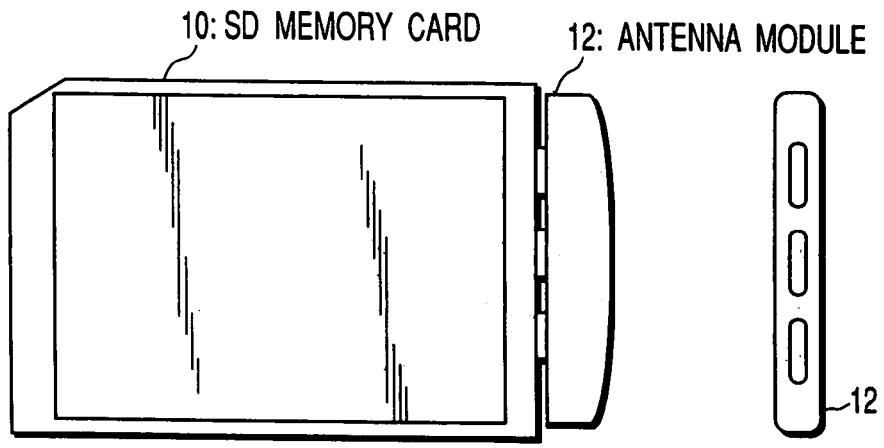
FIGS. 1A-1D are views illustrating the exterior appearance of an IC card (SD memory card) with a radio interface function according to the invention.
Figure 1C:
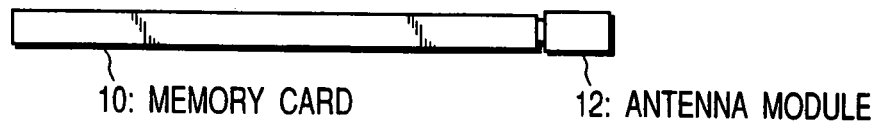
Figure 1D:
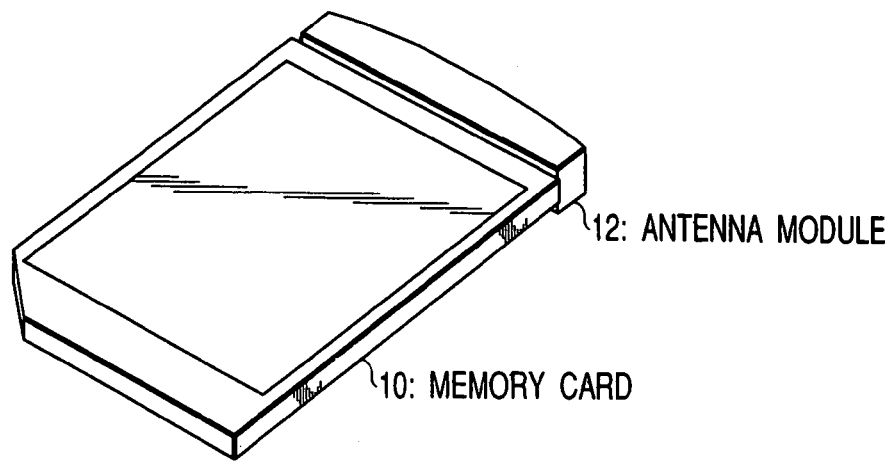

FIGS. 1A-1D show the exterior appearance of an IC card (SD memory card) 10 with a radio interface function according to the invention. As shown in these figures, the SD memory card 10 has a connector (antenna attaching means) through which an antenna module 12 for radio communication can be attached thereto and detached therefrom. The antenna module 12 has a connector (IC card attaching means) to be connected to the connector of the SD memory card 10 so that the module 12 is attached to the SD memory card. FIG. 1A is a plan view showing the connection between the SD memory card 10 and the antenna module 12. FIG. 1B is a view of a connection surface of the antenna module 12 and the SD memory card 10. FIG. 1C is a side view of the connected units shown in FIG. 1A. Further, FIG. 1D is a perspective view of the connected units shown in FIG. 1A. As shown in FIGS. 1A-1D, the antenna module 12 is attached to that side of the SD memory card 10, on which no signal pins are provided.

First Embodiment

The SD memory card 10 shown in FIGS. 1A-1D, according to a first embodiment, will be described.

Figure 2:
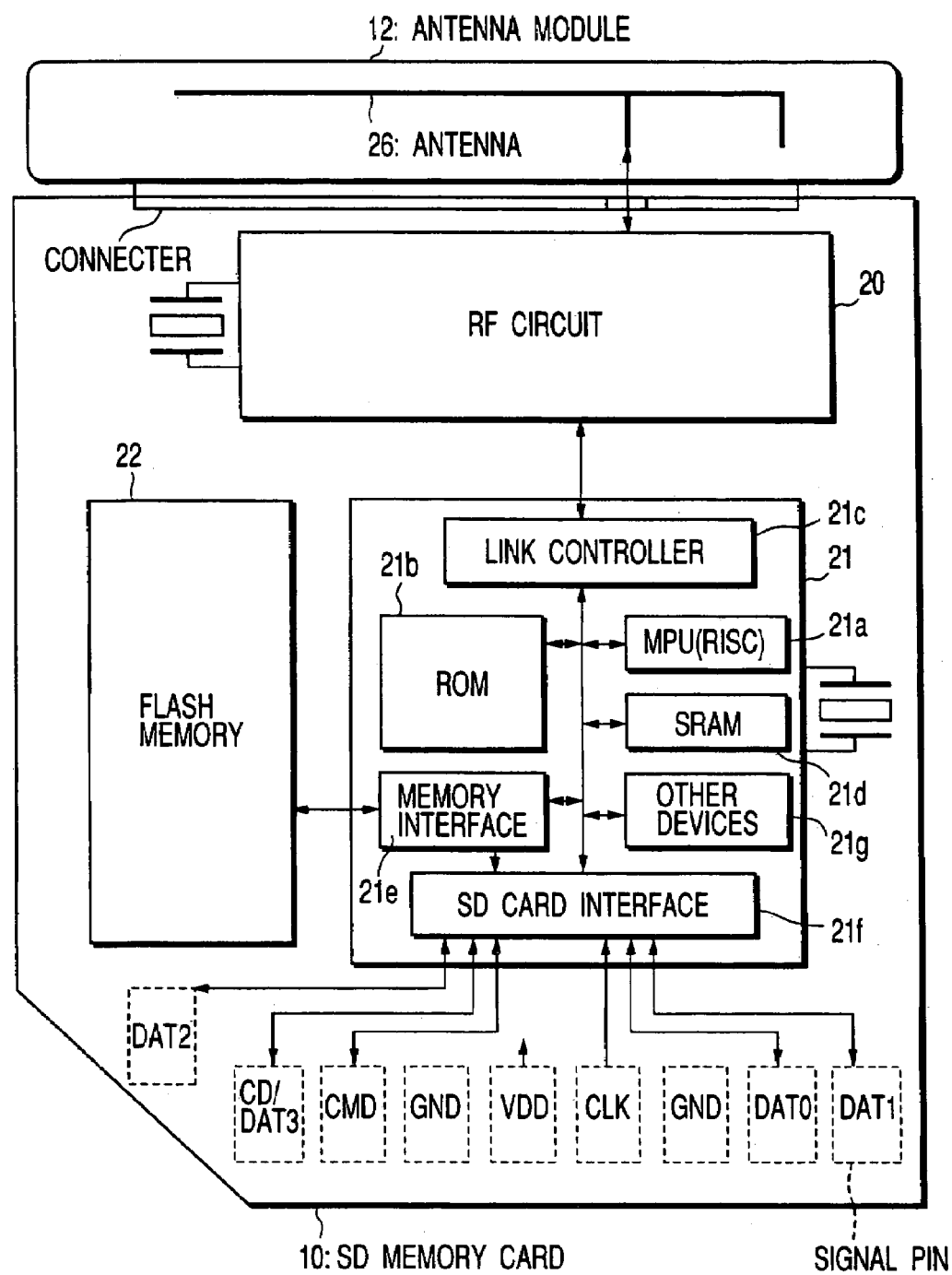
FIG. 2 is a block diagram illustrating an SD memory card 10 and an antenna module 12 employed in a first embodiment of the invention.

FIG. 2 is a block diagram illustrating the SD memory card 10 and the antenna module 12 shown in FIGS. 1A-1D and employed in the first embodiment of the invention. Suppose that the SD memory card 10 of the first embodiment has a radio interface function and uses Bluetooth as a radio communication system.

Bluetooth is the short-distance radio-communication standard, which implements radio communication within a radius of approx. 10 m using 2.45-GHz band. In Bluetooth, the frequency hopping method is used as spectrum diffusion techniques and enables up to eight devices to be connected by time-division multiplexing. In Bluetooth, the devices connected by time-division multiplexing constitute a network called Piconet, where one device functions as a parent device and the other devices function as child devices. In the network (Piconet), connection is certified using a code number called PIN (personal Identification Number) code.

As shown in FIG. 2, the SD memory card 10 contains three elements, i.e. an RF (Radio Frequency) circuit 20, a controller LSI 21 and a flash memory IC (Integrated Circuit) 22.

The RF circuit 20 (RF IC) is a high frequency circuit for executing radio communication based on Bluetooth, and is connected to the antenna module 12 by the connector. The RF circuit 20 is also connected to the controller LSI 21.

The controller LSI 21 executes base band control (radio interface control) on Bluetooth and interface control on the SD memory card, and is connected to the RE circuit 20, the flash memory 22 and signal pins. The controller LSI 21 contains, as shown in FIG. 2, an MPU (RISC) 21a, a ROM 21b storing control programs, a link controller 21c for controlling the lowest protocol of Bluetooth, an SRAM 21d used as a work buffer memory, a memory interface 21e for the flash memory 22, an SD card interface 21f for a plurality of signal pins, and other devices 21g.

The ROM 21b stores a Bluetooth protocol control program, an SD card interface control program, etc. The MPU 21a executes the programs stored in the ROM 21b to thereby execute Bluetooth upper protocol control (Link Manager control, HCI control), interface control on the SD memory card (security data access control, memory access control on the flash memory 22). The security data access control is performed for operating a copyright protection technique called "Personal Identification" and provided in the SD memory card and also in an apparatus (host apparatus) that can use the SD memory card. In the security data access control, when reading data (contents) stored in an SD memory card or writing data into the SD memory card, ID (Identification Data) prestored in the SD memory card in its manufacturing stage is transmitted between the SD memory card and the host apparatus through encryption using key data items provided in both the SD memory card and the host apparatus, thereby managing the copying history of the contents and preventing their unlimited copying.

The flash memory 22 is a flash ROM (EEPROM) for the SD memory card, and includes a system area, a protection area and a general user area.

In light of the efficiency of transmission/reception of radio waves, the advantages of the high frequency antenna for Bluetooth can be realized when it is protruded as much as possible from the casing of a data processing apparatus as the host apparatus. Since, in the structure shown in FIG. 2, the antenna module 12 outwardly protrudes from the SD memory card 10, it protrudes from the casing of the data processing apparatus when the SD memory card 10 is inserted in the card slot of the apparatus. As shown in FIG. 2, when the antenna module 12 is attached to the SD memory card 10, an antenna 26 for Bluetooth incorporated in the module 12 is connected to the RF circuit 20 of the SD memory card 10.

Since the SD memory card 10 has a radio interface function as described above, it can be used to expand the function of the data processing apparatus. Further, when the antenna module 12 is not attached to the card 10, the card 10 is used as a general SD memory card.

In the structure shown in FIG. 2, the MPU 21a executes protocol control on Bluetooth and interface control on the flash memory 22. When installing a radio interface function based on Bluetooth in the SD memory card 10, it is necessary to employ a controller LSI for executing Bluetooth protocol control and a controller LSI for executing SD memory card interface control, which means that two MPUs are required. On the other hand, in the first embodiment, the single MPU 21a is used for Bluetooth protocol control and SD memory card interface control (security data access control, memory access control). In other words, it is sufficient if only one controller LSI 21 is used, which is advantageous in mounting component parts in the SD memory card 10.

Figure 3:
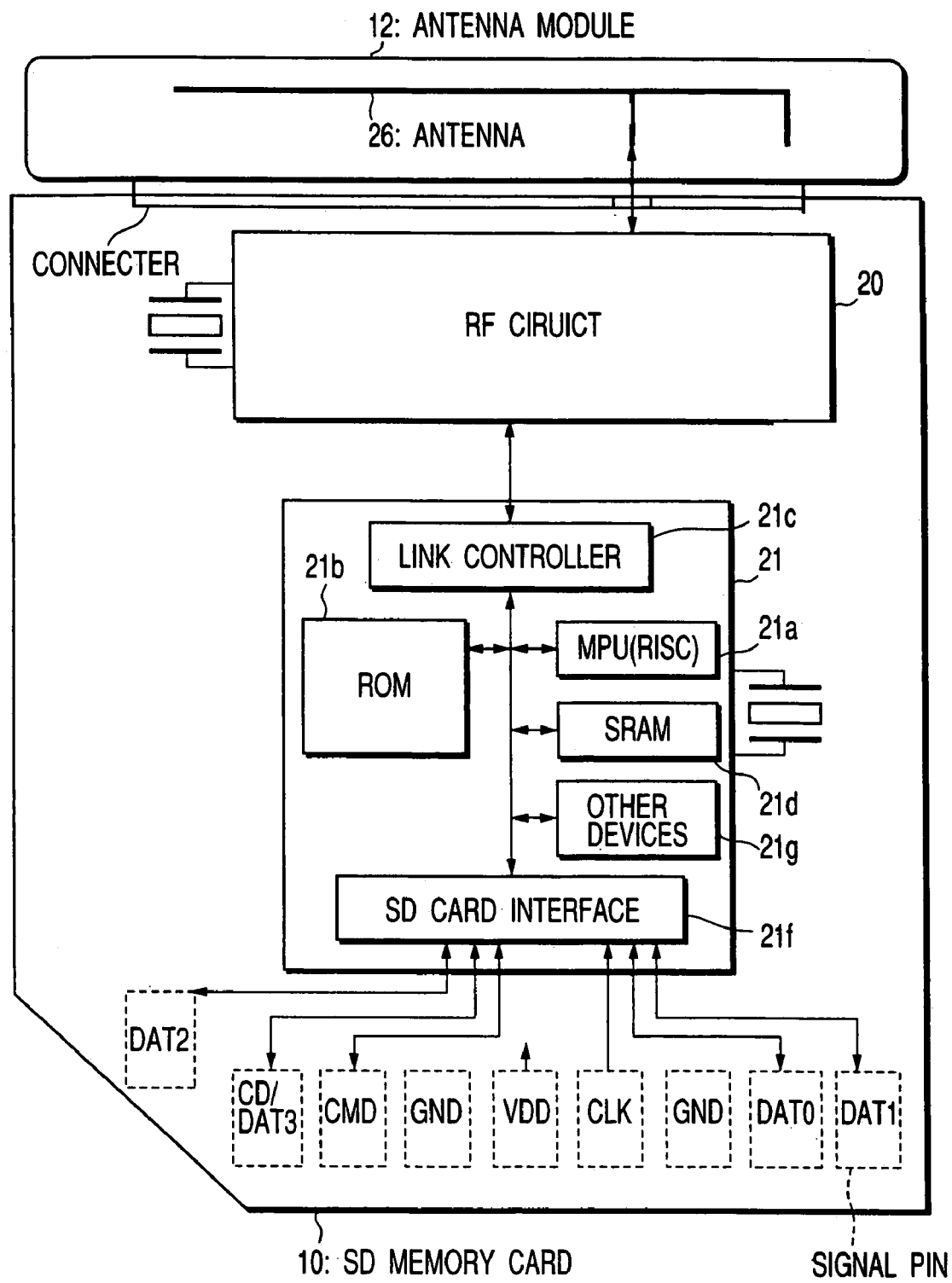
FIG. 3 is a view showing a modification of the SD memory card of FIG. 2.

FIG. 3 shows a modification of the SD memory card 10 of FIG. 2. An SD memory card 10b shown in FIG. 3 does not have the flash memory 22 shown in FIG. 2.

The SD memory card 10 of FIG. 2 can also function as a usual SD memory card, while the SD memory card 10b of FIG. 3 is used as an I/O (Input/Output) card dedicated to the radio interface function.

Second Embodiment

An SD memory card 10c according to a second embodiment will be described.

FIG. 4 is a block diagram illustrating the SD memory card 10c and an antenna module 12 employed in the second embodiment. The SD memory card 10c of the second embodiment differs in the antenna mounting structure from the SD memory card 10 of the first embodiment (shown in FIG. 2 or 3). As shown in FIG. 4, an antenna A27 is provided in the SD memory card 10c along the side of the card on which no signal pins are provided, and is connected to an RF circuit 20. The antenna module 12 can be attached to the SD memory card 10c as in the first embodiment (a connector for attachment is not shown in FIG. 4). When the antenna module 12 is attached to the SD memory card 10c, an antenna B28 for Bluetooth provided in the antenna module 12 is connected to the RF circuit 20 via an antenna connector. The other structural elements are similar to those employed in the first embodiment (FIG. 2), and hence not described.

Provision of the antenna A27 in the SD memory card 10c as shown in FIG. 4 enables the card 10c to have a radio interface function without the antenna module 12.

When, for example, highly efficient transmission/reception of radio waves is not required, i.e. when short-distance radio communication is executed between a mouse as the host apparatus of the SD memory card 10c and a personal computer using the mouse, the SD memory card 10c can be used with the antenna module 12 detached therefrom. Since in this state, there is nothing projecting (i.e. the antenna module 12) from the casing of the host apparatus, the host apparatus can be handled more easily.

On the other hand, when executing radio communication with a device located at a distance from the SD memory card 10c, the card 10c is used with the antenna module 12 attached thereto. As a result, the transmission/reception efficiency of radio waves is enhanced, and a necessary communication distance can be secured.

Thus, the SD memory card 10c can be used as a radio communication interface card both when the antenna module 12 is attached thereto and when it is detached therefrom. Accordingly, the single SD memory card 10c can be used for various purposes. In other words, the card 10c is very versatile.

Third Embodiment

An SD memory card 10d according to a third embodiment will be described.

Figure 5:
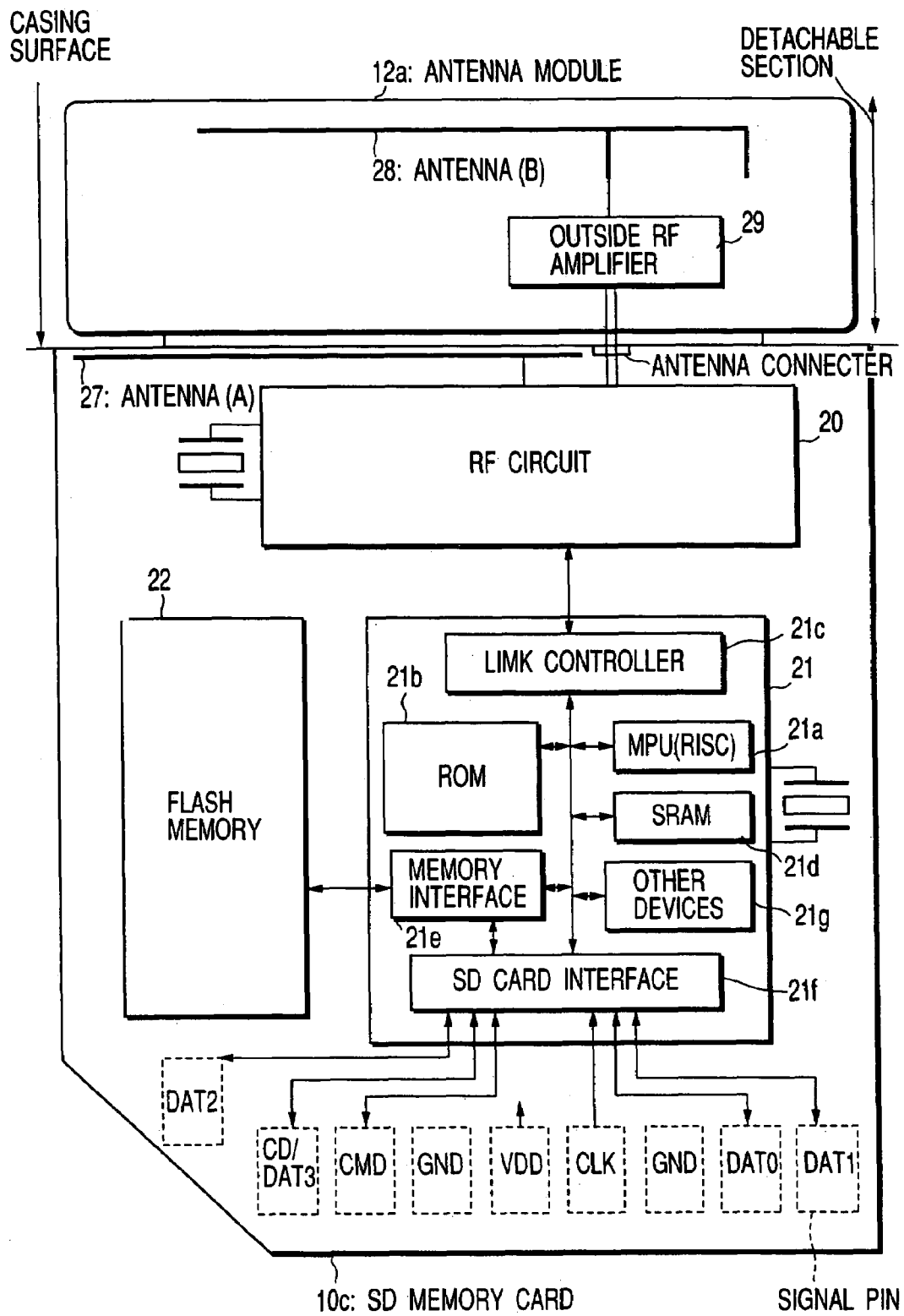
FIG. 5 is a block diagram illustrating an SD memory card 10d and an antenna module 12a employed in a third embodiment of the invention.

FIG. 5 is a block diagram illustrating the SD memory card 10d and an antenna module 12a employed in the third embodiment. The antenna module 12a of the third embodiment has, in addition to the antenna B28 employed in the second embodiment (FIG. 4), an external RF amplifier 29 that serves as part of a high frequency circuit (high frequency amplifier).

Specifically, as shown in FIG. 5, the antenna module 12a contains the internal antenna B28 for Bluetooth, and the external RF amplifier 29. When the antenna module 12a is attached to the SD memory card 10d, the antenna B28 is connected to the RF circuit 20 of the card 10d via the external RF amplifier 29 and an antenna connector. The other structural elements are similar to those employed in the first embodiment (FIG. 2), and hence not described.

The external RF amplifier 29 amplifies a radio signal transmitted or received by the antenna B28.

Accordingly, the attachment of the antenna module 12a to the SD memory card 10d increases the ability to perform radio communication as compared with the second embodiment.

Fourth Embodiment

A fourth embodiment will now be described.

In the first to third embodiments, the external antenna module 12 (12a) is attached to the SD memory card 10 (10c, 10d). In this structure, the antenna module 12 projects from the SD memory card 10, and hence makes it slightly difficult to handle the card 10. In the fourth embodiment, no antenna is directly attached to the SD memory card 10, but an antenna installed in an eject lever, incorporated in a data processing apparatus (host apparatus) is used.

Figure 6A:
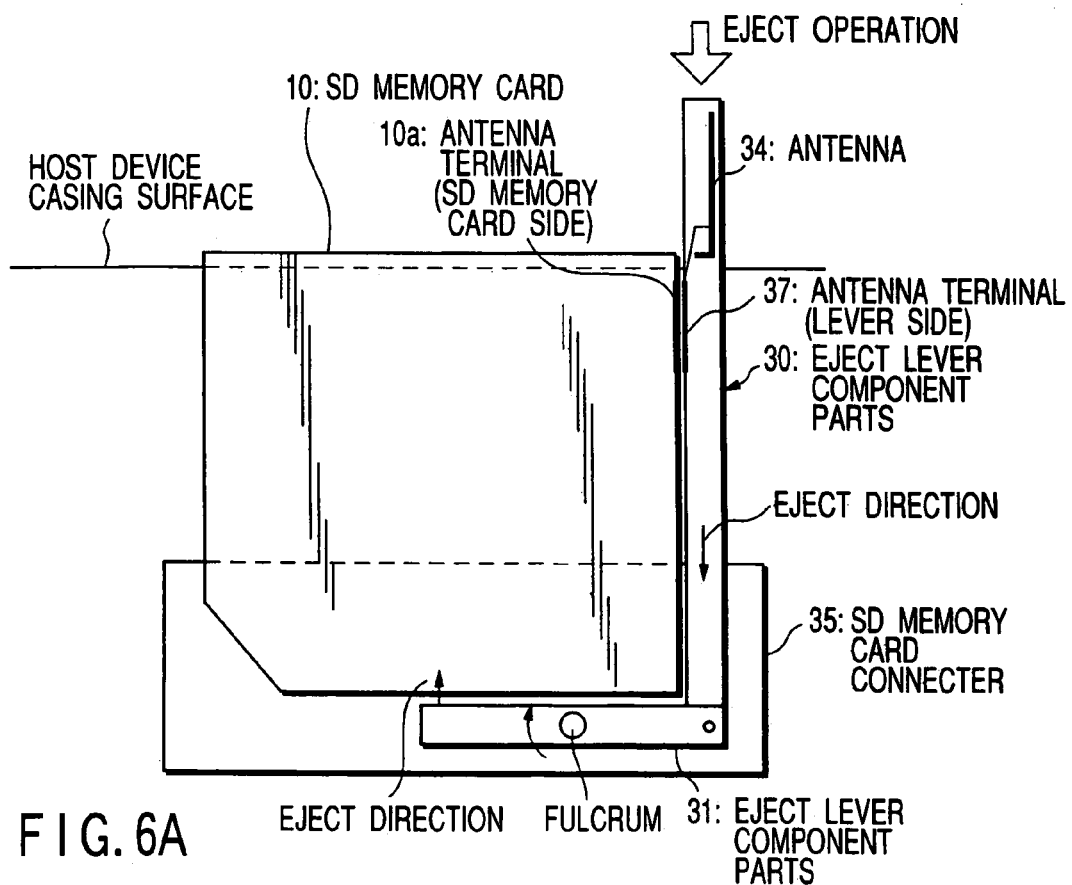
FIGS. 6A-6D are schematic views of a fourth embodiment of the invention, showing a card slot formed in a data processing apparatus (host apparatus), in which an SD memory card 10 can be inserted.

FIGS. 6A-6D are schematic views of the fourth embodiment of the invention, showing a card slot formed in a data processing apparatus (host apparatus), in which the SD memory card 10 can be inserted. As shown in FIG. 6A, the card slot has an eject mechanism formed of eject lever component parts 30 and 31, for ejecting the inserted SD memory card 10. The eject lever component part 30 extends in the card slot in a direction of insertion of the SD memory card 10, and has a distal end portion thereof protruding from the casing surface of the host apparatus, and a proximal end portion thereof coupled to the eject lever component part 31. The eject lever component part 31 extends in the card slot along the inner end (the signal pin side) of the SD memory card 10 when the card 10 is inserted in the slot. When the distal end portion of the eject lever component part 30 is pushed toward the interior of the host apparatus casing 38 (eject operation), the eject lever component part 31 swings about the fulcrum in a direction indicated by the arrow (in a direction of ejection), thereby ejecting, from the casing 38, the SD memory card 10 connected to an SD memory card connector 35. The eject lever component part 30 has an antenna 34 for Bluetooth contained in the portion protruding from the host apparatus casing 38, and an antenna terminal 37 provided on a side portion thereof that touches the SD memory card 10 when the card 10 is inserted in the slot. The antenna terminal 37 is connected to the antenna 34. The entire antenna 34 does not have to extend along the portion of the eject lever component part 30, which protrudes from the host apparatus casing 38, but part of the antenna may extend along the protruding portion.

The SD memory card 10 used in the fourth embodiment has an antenna terminal (antenna connecting terminal) 10a provided on a side portion thereof that touches the antenna terminal 37 of the eject lever component part 30 when the SD memory card 10 is inserted in the card slot. The internal structure of the SD memory card 10 is similar to that of the first to third embodiments, and the antenna terminal 10a is connected to the RF circuit 20 in the card.

Figure 6B:
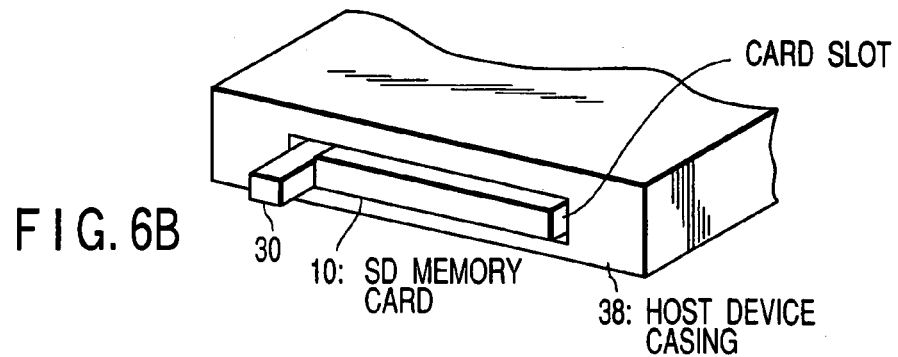

FIG. 6B illustrates a state in which the SD memory card 10 is inserted in the host apparatus casing 38. As shown, the distal end portion of the eject lever component part 30 containing the antenna 34 protrudes from the casing 38, and hence the transmission/reception efficiency of radio waves is enhanced. Further, since it is not necessary to directly attach the antenna module to the SD memory card 10, the card 10 can be handled easily. Moreover, since the antenna 34 installed in the host apparatus is used, to add a radio communication function the user does not have to consider the attachment of an antenna to the card, but just inserts the SD memory card 10 into the card slot, as in the case of a usual SD card.

Figure 6C:
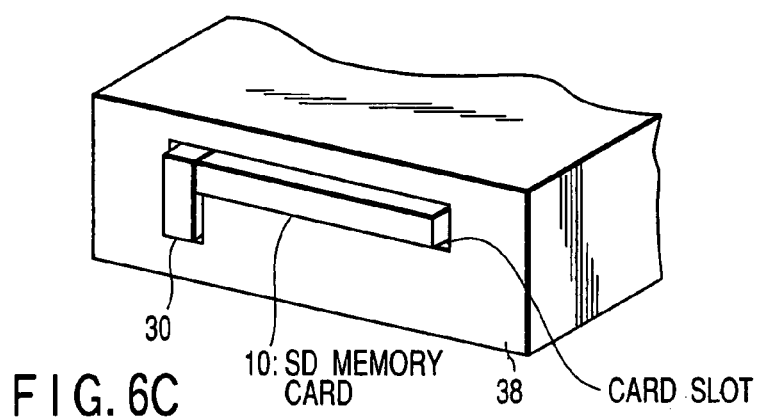
Figure 6D:
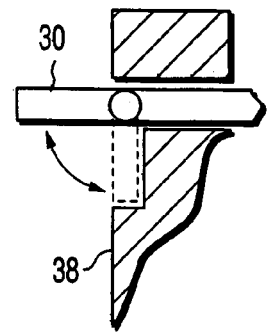

If the host apparatus cannot be handled easily with the eject lever component part 30 protruding from the casing, the protruding portion of the eject lever component part 30 may be constructed as shown in FIG. 6C. When, in the case of FIG. 6C, the SD memory card 10 is inserted in the card slot, the protruding portion of the eject lever component part 30 containing the antenna 34 is bent along the casing surface as shown in FIG. 6D. Even in this state, the transmission/reception efficiency of radio waves is not significantly degraded, since the antenna 34 is exposed to the outside of the casing.

Fifth Embodiment

There now follows a description of a fifth embodiment.

In the above-described fourth embodiment, the antenna 34 used for the SD memory card 10 is provided in the eject lever, while in the fifth embodiment, it is provided on the casing surface of the host apparatus.

Figure 7:
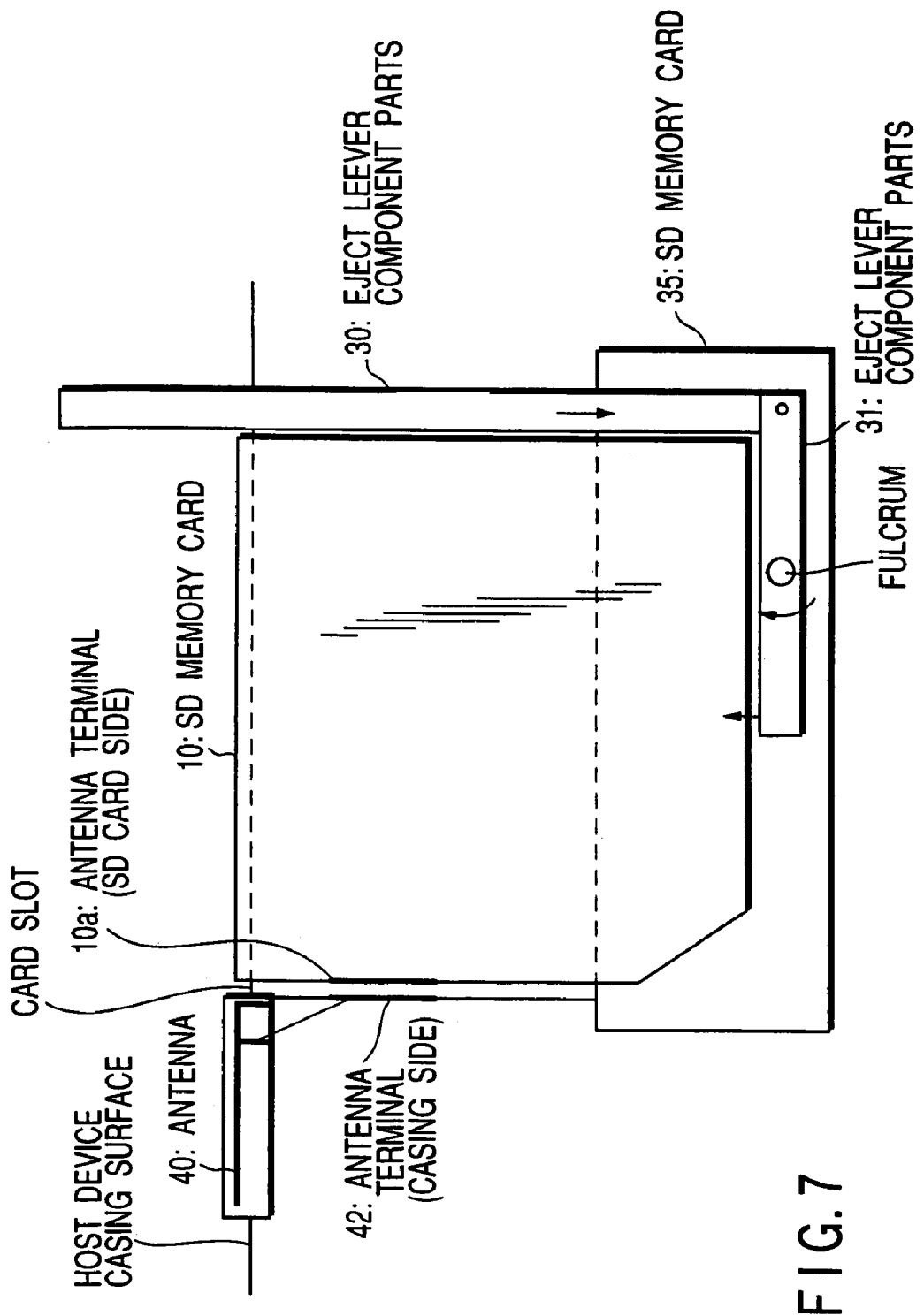
FIG. 7 is a schematic view of a fifth embodiment of the invention, showing a card slot formed in a data processing apparatus (host apparatus), in which an SD memory card 10 can be inserted.

FIG. 7 is a schematic view of the fifth embodiment of the invention, showing a card slot formed in a data processing apparatus (host apparatus), in which the SD memory card 10 can be inserted. As shown, an antenna 40 for Bluetooth is mounted on the surface of the host apparatus casing. An antenna terminal 42 is provided on the surface portion of the card slot, which touches the antenna 40 of the SD memory card 10 when the card is inserted. The antenna terminal 42 is connected to the antenna 40.

Further, in the fifth embodiment, an antenna terminal (antenna connecting terminal) 10a is provided on the side surface portion of the SD memory card 10, which touches the antenna terminal 42 of the card slot when the SD memory card 10 is inserted in the card slot. The internal structure of the SD memory card 10 is similar to that of the first to third embodiments, and the antenna terminal 10a is connected to the RF circuit 20 in the card.

The antenna 40 provided on the surface of the host apparatus casing as shown in FIG. 7 enhances the transmission/reception efficiency of radio waves. Moreover, since it is not necessary to directly attach the antenna module to the SD memory card 10, the card can be handled easily. In addition, since the antenna 40 provided on the host apparatus is used, to add a radio communication function, the user does not have to consider the attachment of an antenna to the card, but just inserts the SD memory card 10 into the card slot, as in the case of a usual SD card.

In the fourth and fifth embodiments, the antenna terminal 10a to be connected to the antenna is provided on the SD memory card 10. However, if one of the signal pins provided in the SD memory card 10 can be used for antenna connection, the embodiments can be modified such that the host-apparatus-side antenna 34 or 40 is connected to the SD memory card 10 via the SD card memory connector 35.

Sixth Embodiment

A sixth embodiment will be described.

Figure 8:
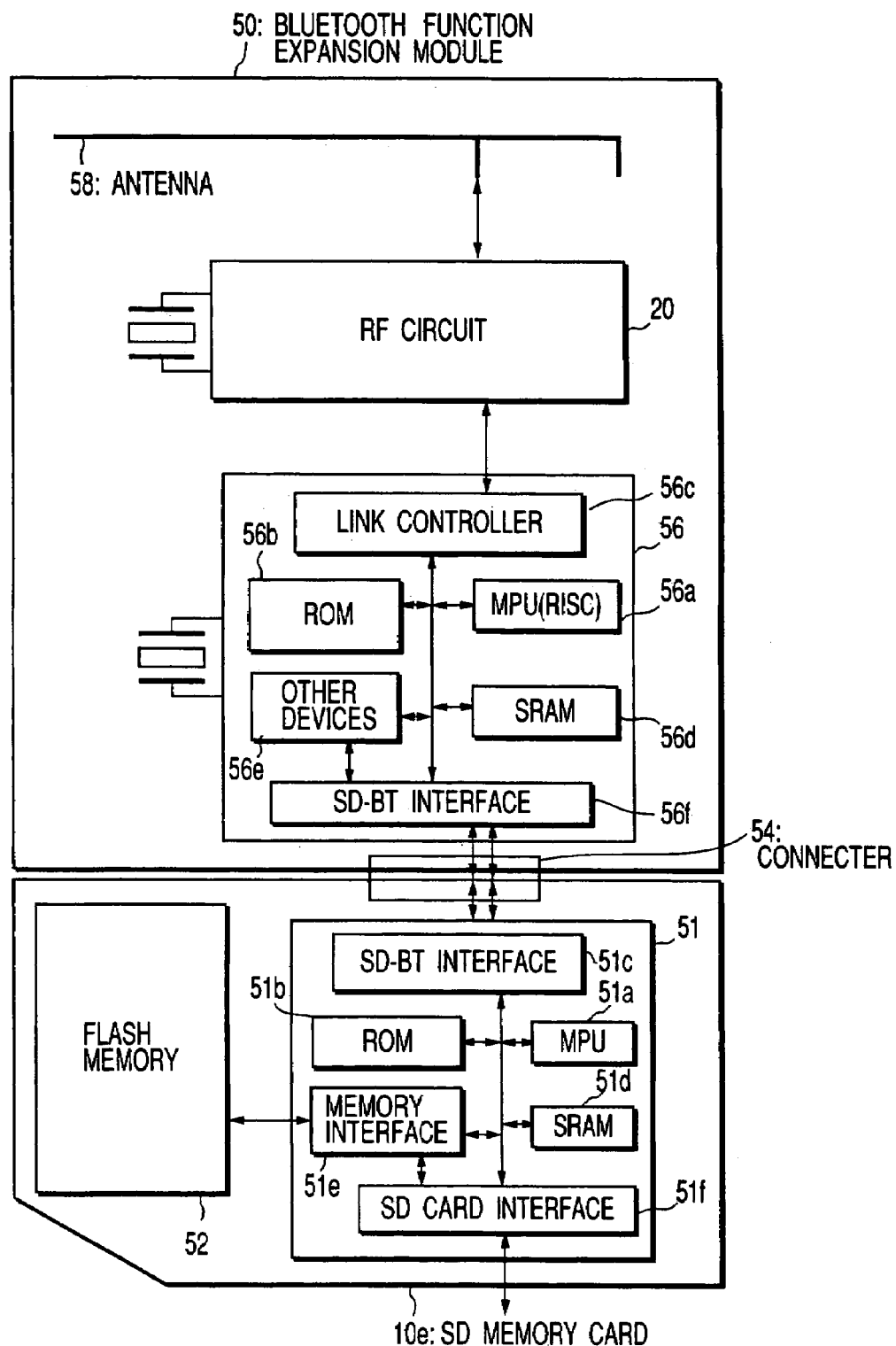
FIG. 8 is a block diagram illustrating an SD memory card 10e and a Bluetooth function expansion module 50 employed in a sixth embodiment of the invention.

In the sixth embodiment, an SD memory card 10e has only a usual SD memory card function, and a Bluetooth function expansion module 50 (an IC card having a radio interface function) is further employed which has a main structure for realizing the Bluetooth function. FIG. 8 illustrates the SD memory card 10e and the Bluetooth function expansion module 50 employed in the sixth embodiment.

The SD memory card 10e shown in FIG. 8 serves as a usual SD memory card when only the card 10e itself is used, and contains a controller LSI 51 and a flash memory 52. The controller LSI 51 includes an MPU 51a, a ROM 51b, an SD-BT interface 51c, an SRAM 51d, a memory interface 51e, and an SD card interface 51f. The controller LSI 51 includes elements similar to those of the controller LSI 21 of FIG. 2, except that it does not include the SD-BT interface 51c and a communication interface function. Accordingly, no detailed description will be given of the controller LSI 21. The SD-BT interface 51c is provided for connecting the SD memory card 10e to the Bluetooth function expansion module 50, using a connector 54.

The Bluetooth function expansion module 50 is an IC card having a radio interface function, and contains an RF circuit 20, a Bluetooth base band LSI 56, and an antenna 58. The Bluetooth base band LSI 56 is provided for executing Bluetooth base band control, and includes an MPU (RISC) 56a, a ROM 56b storing a base band control program, a link controller 56c for controlling the lowest protocol of Bluetooth, an SRAM 56d used as a work buffer memory, other devices 56e, an SD-BT interface 56f for the memory card 10e, etc. The Bluetooth base band LSI 56 is similar to the controller LSI 21 shown in FIG. 2, except that it includes the SD-BT interface 56f and does not have a memory interface function. Therefore, no detailed description will be given of the LSI 56. The SD-BT interface 56f is provided for connecting the module 50 to the SD memory card 10e via the connector 54.

The Bluetooth base band LSI 56 is connected to the RF circuit 20 via the link controller 56c. The RF circuit 20 is connected to the antenna 58 contained in the Bluetooth function expansion module 50.

Thus, the SD memory card 10e can usually be used as a general SD memory card device, and can additionally have a communication interface function when it is connected to the Bluetooth function expansion module 50 that contains the antenna 58, the RF circuit 20 and the Bluetooth base band LSI 56.

The above structure enables easy mounting of component parts in the SD memory card 10e, and enables the use of the card 10e as an SD memory card having a radio interface function by connecting thereto the Bluetooth function expansion module 50.

A description will now be given of a method for setting a destination to which the device of each of the first to sixth embodiments is connected using the radio interface function.

In a radio communication system such as Bluetooth, there is a case where communication is performed with only a predetermined one of communicable devices. In this case, information for specifying the predetermined device is necessary. In Bluetooth, communication of a transmitter only with a predetermined destination device can be realized by pre-registering, for example, a PIN code for the transmitter itself and a PIN code for the destination device as destination information, and executing communication based on the registered information.

For example, in each of the structures employed in the above-described embodiments (except for the structure shown in FIG. 3), the destination information is written beforehand in the protection memory area of the SD memory card. In the case of the SD memory card 10 of FIG. 2, the destination information written in the protection memory area of the flash memory 22 can be read by the controller LSI 21 that executes radio interface control and memory interface control, and can be used in the card as destination recognizing information. As a result, communication with a preset destination device can be executed. On the other hand, the SD memory card 10 cannot access apparatuses other than a predetermined host apparatus having exclusive key data that is certified by the certification means (security data access control means) of the SD memory card.

Usually, it is not preferable that the destination information comes out to or changed by any person other than the owner of the card. In light of this, the data processing system is arranged such that, as described above, (1) the SD memory card 10 is attached to any voluntary host apparatus (such as a personal computer) to thereby enable the host apparatus to communicate with a preset destination device, and (2) change of the destination device or reading of the destination information can be executed only when the SD memory card is attached to the host apparatus.

This arrangement enables enhancement of the convenience of the SD memory card that it can add a radio interface function for setting a destination device, and protection of destination information of high secrecy.

Although, in the above-described embodiments, an SD memory card is used as an IC card having a radio interface function, the invention can be also applicable to a small IC card having another shape and/or another function. Further, the radio communication system is not limited to Bluetooth, but may be another radio communication system that can realize a radio LAN.

As described above in detail, a radio interface function is installed in an IC card (an SD memory card), and hence the IC card is used to expand the function of a data processing apparatus. When no antenna is attached to the SD memory card, the SD memory card can be used as a usual IC card.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory card for insertion into a card slot of a host device, comprising:
   a memory device;
   a plurality of signal pins configured for connection to the host device inside the card slot and include a data pin that receives data from the host device;
   a controller configured to control access to the memory device and to write the data received from the data pin in the memory device; and
   a connector that is attachable to and detachable from an antenna provided in the host device, the connector provided on a side of the memory card where the plurality of signal pins connect to the host device, wherein the connector contacts the antenna inside the card slot if the memory card is inserted into the card slot and the connector is detached from the antenna if the memory card is removed from the card slot.

2. The memory card of claim 1, wherein the controller provides security data access control.

3. The memory card of claim 2, wherein the security data access control involves personal identification.

4. The memory card of claim 3, wherein the personal identification uses identification data stored in the memory device.

5. The memory card of claim 1, wherein the controller includes an SD card interface.

6. The memory card of claim 1, wherein the connector includes signal pins that are to be connected to the antenna.

7. The memory card of claim 1, wherein the connector attaches at least one of the plurality of signal pins to the antenna.

8. The memory card of claim 1, wherein the controller provides protocol control of radio communication using the antenna attached to the connector.

9. The memory card of claim 8, wherein the controller performs Bluetooth protocol control.

10. The memory card of claim 1, further comprising an internal antenna, and wherein the controller provides protocol control of radio communication using the antenna contacting the connector and the internal antenna.

11. The memory card of claim 10, wherein the internal antenna is provided on a side of the memory card where the plurality of signal pins are not provided.

12. The memory card of claim 1, wherein the connector is provided on a side of the memory card that is parallel to a direction in which the memory card is inserted into the card slot.

* * * * *